June 16, 1925.  1,541,817

G. H. HUMM

VARIABLE RESISTANCE GRID LEAK FOR RADIO APPARATUS

Filed Feb. 11, 1924

Inventor
George H. Humm
By Attorneys
Chamberlain & Newman

Patented June 16, 1925.

1,541,817

UNITED STATES PATENT OFFICE.

GEORGE H. HUMM, OF FAIRFIELD, CONNECTICUT, ASSIGNOR TO RADIO FOUNDATION, INC., OF BROOKLYN, NEW YORK, A CORPORATION OF NEW YORK.

VARIABLE-RESISTANCE GRID LEAK FOR RADIO APPARATUS.

Application filed February 11, 1924. Serial No. 692,049.

*To all whom it may concern:*

Be it known that GEORGE H. HUMM, a subject of the King of Great Britain, and resident of Fairfield, in the county of Fairfield and State of Connecticut, has invented certain new and useful Improvements in Variable-Resistance Grid Leaks for Radio Apparatus, of which the following is a specification.

This invention relates to a variable resistance, especially for use with radio apparatus, and particularly a variable resistance grid leak for shunting the condenser between the vacuum tube and antenna in series with the grid of the tube. As is well known, a high resistance leak is necessary across the grid condenser to relieve the grid of the surplus of electrons of such polarity as would, if allowed to accumulate, choke the tube and cause distorted signals.

It is an object of the present invention to provide a variable resistance which will provide a given maximum and minimum resistance, and in which a continuous range of varying resistances may be provided between these points, so that the variation of voltage across the grid condenser, occasioned by the power, distances, or other varying factors of different broadcasting stations, may be accurately compensated for, permitting a higher resistance to be placed in the circuit during the reception of weak signals, so that a minimum of energy is lost, and a reduced resistance during the reception of strong signals, to prevent distortion.

Further objects are to provide a device of this character which will be of simple and durable construction, convenient to install and manipulate, and will not deteriorate through use or age.

While the invention is illustrated and described in connection with radio reception apparatus, it will be obvious that the same may be used in any electrical or radio circuit in which a variable high resistance is desirable.

With the above and other objects in view, an embodiment of the invention is shown in the accompanying drawings, and this embodiment will be hereinafter more fully described with reference thereto, and the invention will be finally pointed out in the claims.

In the drawings.

Similar reference characters indicate corresponding parts throughout the several figures of the drawings.

Figure 1:
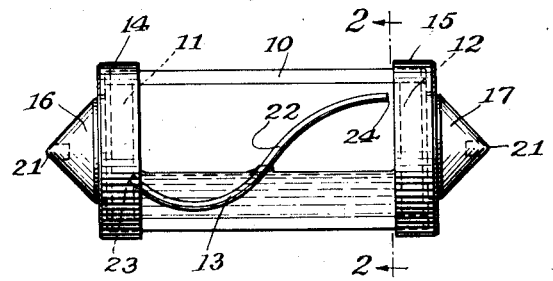
Fig. 1 is a side elevation of grid leak resistance, according to the present embodiment of the invention, and showing the same in an intermediate position of adjustment.
Figure 2:
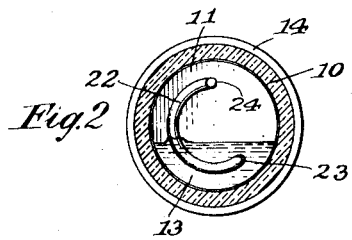
Fig. 2 is a vertical sectional view, taken along the line 2—2 of Fig. 1.

Referring to the drawings, the embodiment of the invention shown therein comprises a glass cylinder 10 having caps 11 and 12, of copper, brass, or other suitable conductive material, inserted and sealed in the respective ends, by cement or the like, to seal a liquid resistance medium 13 within the tube, this being preferably a viscous fluid, as glycerine, and of such quantity that in the horizontal position of the tube it will assume a level somewhat below the center.

Figure 4:
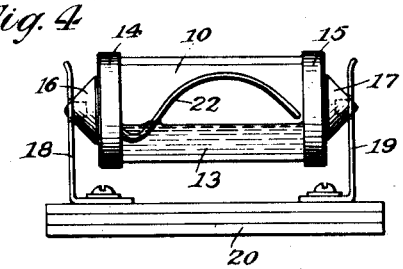
Figs. 4 and 5 are side elevations of the grid leak, mounted in the usual spring clips of a grid condenser.
Figure 5:
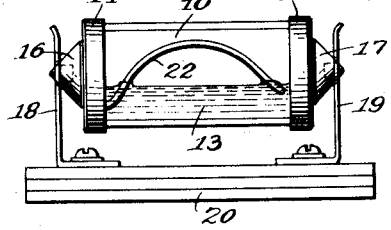

Flanged collars 14 and 15 are provided over the ends of the tube in a manner to engage the ends of the metal caps, which latter are provided with pointed portions 16 and 17 projecting through the apertures of the collars and adapted to be centered in the standard apertured spring mounts 18 and 19 of the usual grid condenser 20, as shown in Figs. 4 and 5. Holes 21 are provided in the ends 16 and 17, so that, if desired, a panel control may be connected to the device.

One of the caps has a spiral wire 22 electrically attached thereto at its end by insertion in a hole 23, or by soldering, or in any suitable manner, and is disposed in the tube in such a way that a helix is formed therein in spaced relation to its wall, and dipping into the liquid resistance medium 13. As best shown in Fig. 1 the wire 22 is, throughout its length, spaced from the walls of the tube. The opposite end of the wire is just free from and not connected to the other cap, thus leaving a gap 24 between the same and the cap.

By revolving the cylinder about its horizontal axis the length of the fluid through which the electric currents have to pass is altered by the fact that the spiral wire leaves the liquid spirally, thus varying the length of the mass of fluid between the point of emergence of the wire and the cap 12, and thereby altering the resistance opposed to the flow of current over a continuous range between the predetermined maximum and minimum resistances. The resistance varies directly as the length of the conducting path, so that during the reception of weak signals the maximum resistance, as shown in Fig. 4 is employed, and substantially the full voltage passes across the grid condenser, while conversely, the minimum resistance, as shown in Fig. 5, is employed during the reception of strong signals, so that a greater number of electrons are by-passed from the grid circuit back to the filament, thus preventing choking and distorted reception.

Figure 3:
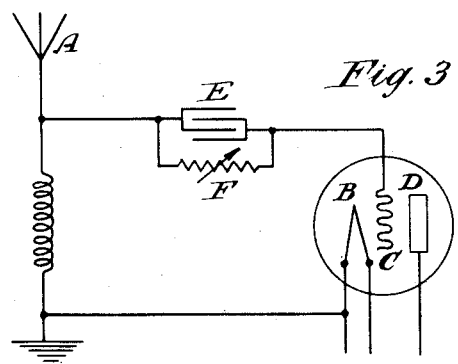
Fig. 3 is a diagram of a type of radio circuit, in which the grid leak is employed, the same being a portion of a detector tube circuit.

The diagram shown in Fig. 3 represents a well known detector tube circuit, employing the adjustable resistance grid leak, and including an antenna A, a detector tube having a filament B, grid C and plate D, a grid condenser E, and an adjustable grid leak F acting as a by-pass for the condenser.

The device of my invention is of simple and reliable construction and operation, will provide an accurate continuous range of resistances, and will not deteriorate through long use or age.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:

1. An electrical resistance comprising a container of non-conducting material, a fluid mass within the container and constituting a high resistance conductor, a conductor wire adapted to vary the resistance of the fluid by being more or less submerged therein, said wire being secured to one end of the container adjacent to but spaced from the side wall of the container and likewise spaced from said container throughout the length of the wire.

2. An electrical resistance comprising a cylindrical tubular container and constituting a high resistance conductor, electrodes closing the ends of the container, a conductor wire secured to one of the electrodes at a point out of alignment with the axis of the tube and projecting longitudinally thereof and spaced from the side walls thereof, said wire adapted to vary the resistance of the fluid but being more or less submerged.

3. An electrical resistance comprising a fluid within a non-conducting tube, closure means at each end of the tube, and a spiral conductor wire fixed to one of the closure means adjacent to but spaced from the tube and spaced from the other closure means and forming a helix about the horizontal axis of the tube and partially submerged in the fluid, the said conductor adapted upon rotation about its horizontal axis to vary the active resistance of the fluid between one closure means and the point of submersion of the conductor wire.

4. An electrical resistance comprising a fluid within a non-conducting tube, electrodes closing the ends of the tube, and a spiral wire fixed to one of the electrodes and extending adjacent to but out of contact with the sides of the tube, said wire adapted to vary the resistance of the fluid by being more or less submerged therein, and said wire being spaced from the sides of the tube in order that a portion of the fluid, will not be caught between it and the tube when it is raised out of the fluid.

5. In combination, a container of non-conducting material, a fluid mass within the container and constituting a high resistance conductor, and a conductor wire adapted to vary the resistance of the fluid by being more or less submerged therein, said wire being spaced from the sides of the container throughout the length of the wire.

6. In combination, a container of non-conducting material, a fluid mass within the container and constituting a high resistance conductor, and a conductor wire including a spiral, said wire adapted to vary the resistance of the fluid by being more or less submerged therein, and said wire throughout its length being spaced from the sides of the container.

7. In combination, an open ended container of non-conducting material, a fluid mass within the container and constituting a high resistance conductor, electrodes closing the ends of the container, and a conductor wire secured to one of the electrodes and projecting longitudinally of the tube and spaced from the walls thereof, said wire adapted to vary the resistance of the fluid by being more or less submerged therein.

Signed at Stratfield, in the county of Fairfield and State of Connecticut, this 8th day of February, A. D., 1924.

GEORGE H. HUMM.

Witnesses:
EDW. S. OSTEYER,
JOHN J. TROMER.